Figure 5:
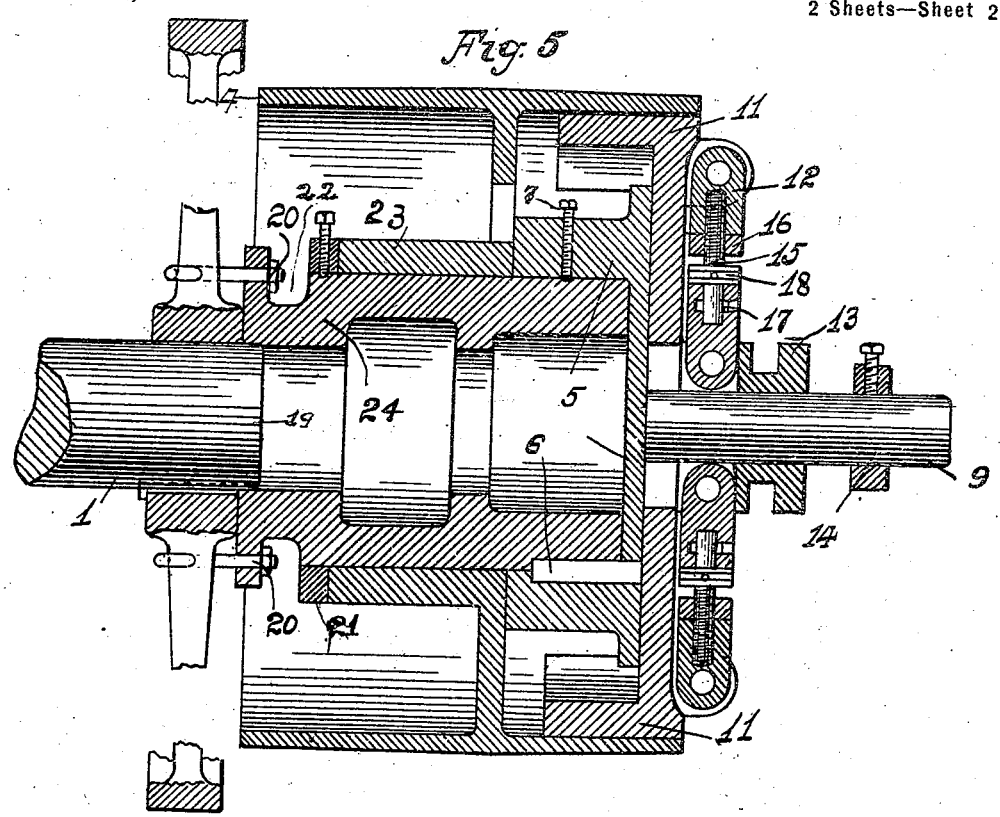

No. 631,740. Patented Aug. 22, 1899.
J. E. FRANKLIN.
CLUTCH PULLEY.
(Application filed Jan. 19, 1899.)
(No Model.) 2 Sheets—Sheet 1.
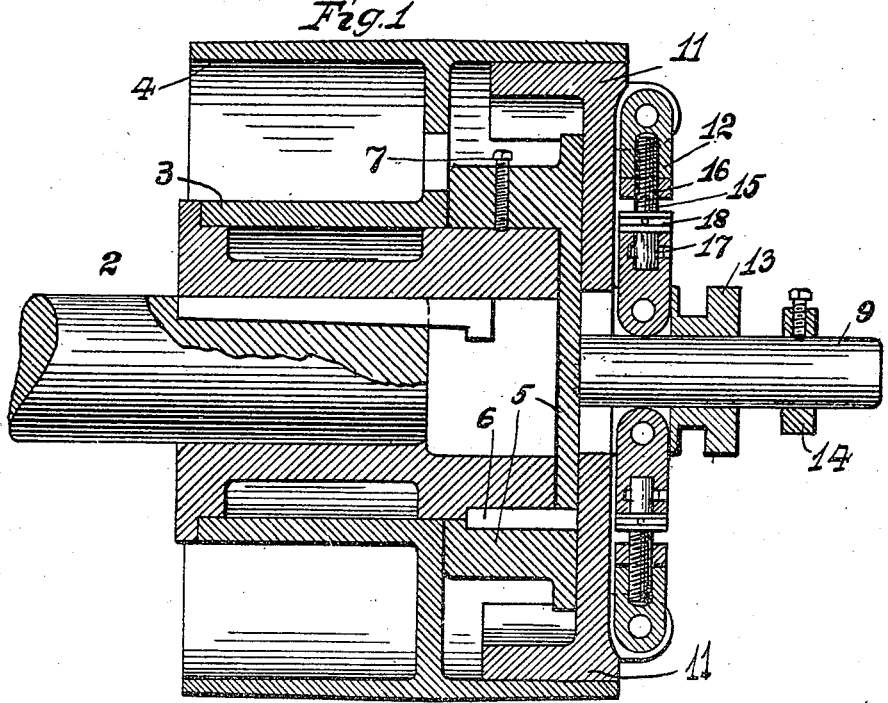
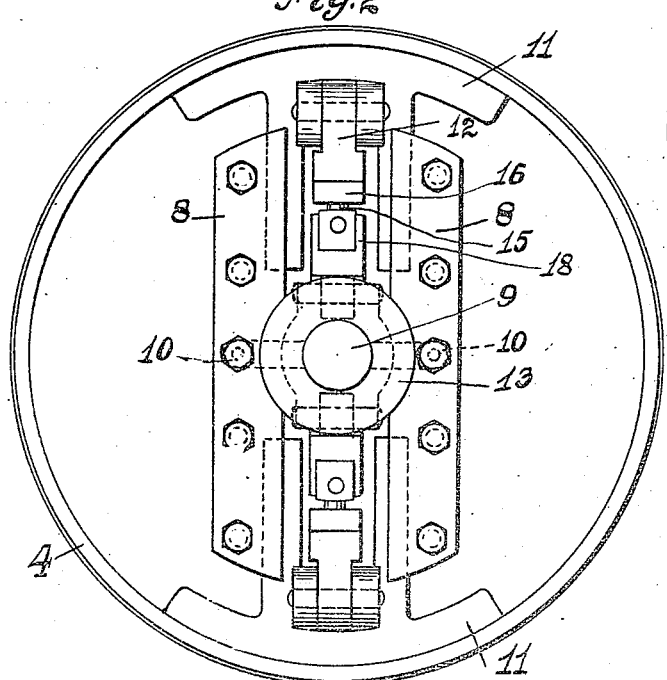
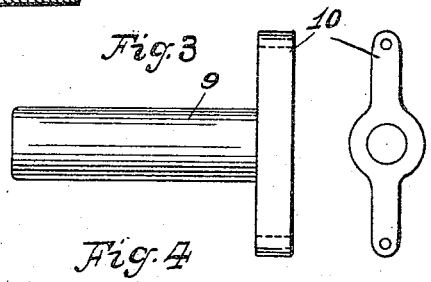
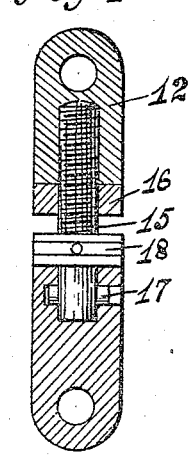
WITNESSES:
Frank McIlvane
CCKean
INVENTOR
J. E. Franklin
BY
Jno. Hazlit.
ATTORNEY.

No. 631,740. Patented Aug. 22, 1899.
J. E. FRANKLIN.
CLUTCH PULLEY.
(Application filed Jan. 19, 1899.)
(No Model.) 2 Sheets—Sheet 2.

WITNESSES:

INVENTOR
J. E. Franklin
BY
ATTORNEY

UNITED STATES PATENT OFFICE.

JOSEPH E. FRANKLIN, OF BUTLER, PENNSYLVANIA, ASSIGNOR OF ONE-HALF TO EVAN EVANS, OF SAME PLACE.

CLUTCH-PULLEY.

SPECIFICATION forming part of Letters Patent No. 631,740, dated August 22, 1899.

Application filed January 19, 1899. Serial No. 702,621. (No model.)

*To all whom it may concern:*

Be it known that I, JOSEPH E. FRANKLIN, a citizen of the United States, residing at Butler, in the county of Butler and State of Pennsylvania, have invented new and useful Improvements in Clutch-Pulleys, of which the following is a specification.

This invention relates to clutch-pulleys; and the primary object thereof is to provide a pulley capable of being mounted in extended position on the end of a steam or gas engine shaft.

A further object is to provide certain clutch mechanism of improved construction.

Ordinarily steam-engine shafts have not sufficient length to accommodate clutch-pulleys of form now in use. In the drilling of oil and gas wells combined steam and gas engines are coming into general use, and for engines of this type clutch-pulleys are a necessity. To equip the engines with new and longer shafts is expensive, and when so equipped the longer shaft and bearings therefor are in the way. Economic practice calls for a pulley capable of quick mounting on engine-shafts of ordinary length, or, in other words, shafts having only short projection from their bearings or from fly-wheels mounted thereon and without disturbing such bearings or wheels, and the present invention is directed to supplying a pulley which will meet these requirements.

The invention consists in certain novel features of construction, and in the combination and arrangement of parts hereinafter fully described and claimed, and illustrated by the accompanying drawings, in which—

Figure 1 is a longitudinal section. Fig. 2 is a face view. Fig. 3 is a detail view of the projecting stud. Fig. 4 is a similar view of one of the clutch-shoe links. Fig. 4ª is a cross-section of one of the clutch-shoe links, illustrating the swivel. Fig. 5 is a longitudinal section illustrating the pulley mounted on the end of a shaft with a fly-wheel.

Keyed to the projecting end of engine-shaft 1 is elongated hub 2, upon which hub 3 of pulley 4 has suitable bearing.

5 is a cap-hub embracing the end of hub 2, being secured thereto by key 6 and set-screw 7, and this cap-hub confines the pulley loosely on hub 2.

Bolted to the outer face of cap 5 are shoe-guides 8, and projecting centrally from the cap concentrically with engine-shaft 1 is stud 9, provided with lateral wings 10, which extend back of guides 8 and through which two of the guide-securing bolts extend, thus uniting the stud rigidly with the cap-hub.

11 are the clutch-shoes for engaging the pulley-periphery in usual manner and which move longitudinally behind guides 8, the adjustment being effected by links 12, connecting the shoes with shifting collar 13 on stud 9. A strap and yoke of usual or any preferred form (not shown) are employed for moving collar 13, the outward thrust thereof being limited by stop 14. Links 12 are made in two parts, as shown, and swiveled in one part is screw 15, which is threaded into the other part and held in fixed adjustment by lock-nut 16. The swivel is formed by reaming an annular cavity in the end socket of one of the link members, and then after the apertured screw-shank is inserted a swivel-pin 17 is driven in place through a side aperture in the link member. The screw is provided with a spanner or other wrench hold 18. By this means wear is taken up and also the clutch-shoes may be adapted exactly to the pulley used.

Usually the engine-shaft is extended beyond the bearing from six to eight inches, and as a projection of six inches is ample for the pulley-mounting I have experienced no difficulty in adapting the pulley to shafts of minimum length.

The construction illustrated in Fig. 5 is adapted for engines having a fly-wheel at each end of the shaft. In such case the projecting end 19 of the engine-shaft is sufficient to center hub 24, while the inner portion of the hub is routed at 22 to make room for bolts 20, and the latter at their outer ends hook over the fly-wheel spokes and securely clamp the pulley in place. Collar 21, secured to hub 24, constitutes a stop for the end of pulley-hub 23. In this form of mounting the clutch is securely held with practically its whole length in extended position.

Having thus fully described my invention, what I claim as new, and desire to secure by Letters Patent, is—

1. In a clutch-pulley attachable in extended position to the extremity of a shaft, the combination of a hub adapted to be secured at one end to the extremity of a shaft and project therefrom longitudinally, a pulley rotatable on the hub, a cap embracing and fixed to the outer end of the hub and forming a stop for the pulley, a support projecting outward from the cap and alining with the shaft, clutch mechanism, and clutch-actuating mechanism operative on the support, substantially as shown and described.

2. An improved clutch-pulley consisting of a hub adapted to be carried by an engine-shaft and extend beyond the end thereof, a pulley normally loose on the hub, an outwardly-extending stud at the outer end of the hub, clutching mechanism, and clutch-adjusting mechanism operative on said stud, substantially as shown and described.

3. An improved clutch-pulley consisting of a hub adapted to be secured to the extremity of a shaft and project longitudinally therefrom, a pulley normally loose on the hub, a stud, means for securing the stud to the outer end of the hub and in line with the shaft, clutch mechanism, and clutch-actuating mechanism operative on the stud, substantially as shown and described.

4. An improved clutch-pulley consisting of a hub adapted to be carried by an engine-shaft and extended beyond the end thereof, a pulley normally loose on the hub, a cap-hub secured to the outer end of the first-mentioned hub, shoe-guides on the outer face of the cap-hub, a centrally-arranged stud secured to and projecting outward from the cap-hub, the stud being provided with lateral wings through which the guide-securing bolts extend, clutch-shoes, and shoe-adjusting mechanism operative on the extended stud, substantially as shown and described.

5. A clutch-shoe link formed in two members, one of the members having an end socket formed with an annular side depression from which extends a pin-aperture, a screw at one end threaded into the other member of the link and having its shank end apertured and inserted in the annularly-depressed socket, and a pin introduced through the socket-aperture and confined in the shank-aperture to form a swivel, substantially as shown and described.

6. A projecting pulley and pulley-mounting for engine-shafts comprising a sleeve having short connection with a shaft and projecting from the end thereof and rigidly secured thereto, a pulley revoluble on the sleeve in extended position from the shaft end, a stop on the sleeve for the inner end of the pulley, a cap embracing the outer end of the sleeve and forming a stop for the outer end of the pulley, a stud secured to and projecting outward from the cap in line centrally with the shaft, and clutch-shoe mechanism operative on the cap and stud, substantially as shown and described.

In testimony whereof I have hereunto set my hand in presence of two subscribing witnesses.

JOSEPH E. FRANKLIN.

Witnesses:
E. E. YOUNG,
J. B. MATES.